US011103951B2

(12) United States Patent
Guenther

(10) Patent No.: US 11,103,951 B2
(45) Date of Patent: Aug. 31, 2021

(54) DEVICE FOR SUPPLYING COOLANT, CONTROL SYSTEM FOR SUCH A DEVICE, AND A METHOD FOR OPERATING SUCH A COOLANT SUPPLY SYSTEM

(71) Applicant: Christian Guenther, Heilbronn (DE)

(72) Inventor: Christian Guenther, Heilbronn (DE)

( * ) Notice: Subject to any disclaimer, the term of this patent is extended or adjusted under 35 U.S.C. 154(b) by 583 days.

(21) Appl. No.: 15/559,057

(22) PCT Filed: Jan. 26, 2016

(86) PCT No.: PCT/DE2016/200044
§ 371 (c)(1),
(2) Date: Sep. 17, 2017

(87) PCT Pub. No.: WO2016/146114
PCT Pub. Date: Sep. 22, 2016

(65) Prior Publication Data
US 2018/0071857 A1 Mar. 15, 2018

(30) Foreign Application Priority Data
Mar. 17, 2015 (DE) .......................... 102015204812.8

(51) Int. Cl.
*F01P 7/14* (2006.01)
*B23K 11/30* (2006.01)
(Continued)

(52) U.S. Cl.
CPC .......... *B23K 11/3018* (2013.01); *B23K 9/285* (2013.01); *B23K 26/703* (2015.10); *B23K 37/003* (2013.01)

(58) Field of Classification Search
CPC ... B23K 26/703; B23K 26/342; B23K 37/003
(Continued)

(56) References Cited

U.S. PATENT DOCUMENTS 4,286,551 A * 9/1981 Blitz .................. B60H 1/00492
123/142.5 E
4,742,841 A * 5/1988 Vonderhaar ........ B23K 11/3018
137/115.21
(Continued)

FOREIGN PATENT DOCUMENTS

DE 202007011304 U1 10/2007
WO 2010005368 A1 1/2010

OTHER PUBLICATIONS

International Search Report for PCT/DE2016/200044 dated Aug. 11, 2016.

*Primary Examiner* — Robert J Utama
*Assistant Examiner* — Lawrence H Samuels
(74) *Attorney, Agent, or Firm* — McDonnell Boehnen Hulbert & Berghoff LLP

(57) ABSTRACT

The invention relates to a coolant supply device of a machining device to be supplied with a fluid coolant, particularly with water, for example a welding arrangement (2) or a welding robot etc., the region or tool to be cooled, for example a welding cap, being incorporated into an open or closed coolant circuit which has an inflow (4) and an outflow (5), and said device comprising a conveyor device that operates in the coolant circuit and conveys the coolant within said coolant circuit, and a control device (8) for deactivating said conveyor device and/or closing the inflow (4) and/or outflow (5) and evacuating said inflow (4) and/or outflow (5) such that, in the region of the tool being cooled, an at least negligible level of negative pressure prevails in the inflow line (9) and/or in the outflow line (12).

12 Claims, 4 Drawing Sheets

Figure 1:
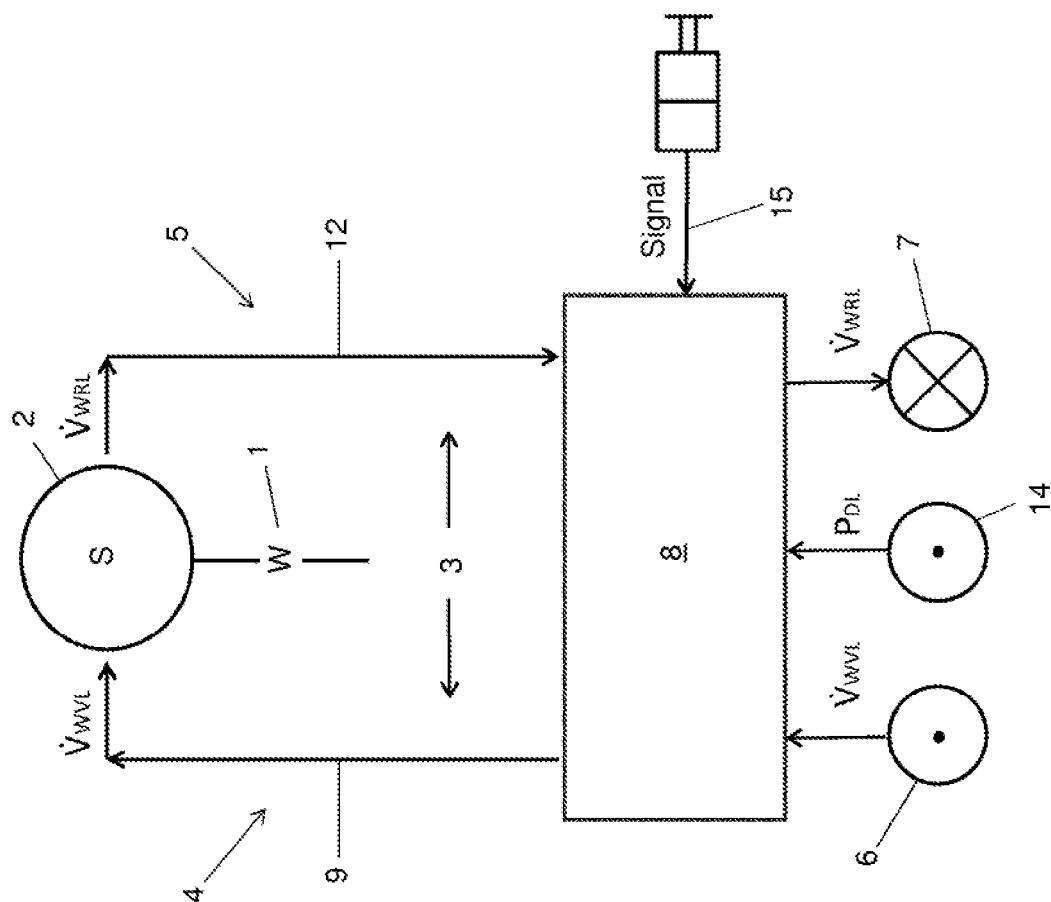

(51) Int. Cl.
*B23K 9/28* (2006.01)
*B23K 37/00* (2006.01)
*B23K 26/70* (2014.01)

(58) Field of Classification Search
USPC .......................................................... 219/136
See application file for complete search history.

(56) References Cited

U.S. PATENT DOCUMENTS

| | | | | |
|---|---|---|---|---|
| 5,719,367 | A * | 2/1998 | Young | B23K 11/3054 |
| | | | | 137/459 |
| 6,082,626 | A * | 7/2000 | Morikawa | B60H 1/02 |
| | | | | 237/12.3 B |
| 6,237,408 | B1 * | 5/2001 | McCormick | B23K 9/323 |
| | | | | 73/196 |
| 7,598,472 | B2 * | 10/2009 | Lotha | B23K 11/3018 |
| | | | | 219/120 |
| 2002/0148416 | A1 * | 10/2002 | Cohen | F01P 7/16 |
| | | | | 123/41.1 |
| 2011/0114614 | A1 * | 5/2011 | Flink | B23K 9/285 |
| | | | | 219/136 |
| 2014/0216708 | A1 * | 8/2014 | Hamm | F28F 27/00 |
| | | | | 165/281 |
| 2014/0251973 | A1 * | 9/2014 | Oberndorfer | B23K 9/285 |
| | | | | 219/137.62 |

* cited by examiner (Key: WVL: water feed line; WRL: water return line; DL: pressure line)

(Key: VL: inflow; RL: outflow; DL: pressure line; VZV: delay valve)

DEVICE FOR SUPPLYING COOLANT, CONTROL SYSTEM FOR SUCH A DEVICE, AND A METHOD FOR OPERATING SUCH A COOLANT SUPPLY SYSTEM

This application is a U.S. National Phase Application pursuant to 35 U.S.C. § 371 of International Application No. PCT/DE2016/200044 filed Jan. 26, 2016, which claims priority to German Patent Application No. 10 2015 204 812.8 filed Mar. 17, 2015. The entire disclosure contents of this application is herewith incorporated by reference into the present application.

The invention relates to a device for supplying coolant to a machining device to be supplied with a liquid coolant. The coolant is normally water. Merely by way of example, reference is made to a welding machine or a welding robot, the welding cap of which is to be cooled. Similarly, the machining device can be an induction unit having a cooled induction coil. The important thing is that a region of the machining device, in particular a tool, is incorporated in an open or closed coolant circuit. The coolant circuit comprises an inflow and an outflow, normally defined by corresponding coolant lines.

Such devices are sufficiently known from the field. These devices are particularly problematic regarding the handling of the coolant, when the tool located in the coolant circuit (forming a part of the coolant circuit) must be replaced for maintenance or repair purposes. The same applies with disruptions or tool losses, caused for example, when a cap has been torn off or a hose bursts. The coolant circuit is at least slightly pressurized, such that when the tool is removed, coolant escapes into the environment. With a charged coolant, there is the danger of contamination to the environment. Operators are regularly exposed to the loads by the coolant, e.g. when the coolant is loaded with germs.

It is already known in the field to shut down the pump that circulates the coolant prior to exchanging tools. This is not sufficient, however, to prevent coolant escaping at the connection points. In addition, longer or very long elastic coolant lines, which expand at least slightly due to the coolant pressure, are problematic.

The present invention thus addresses the object of eliminating, at least substantially, the aforementioned problems. The escaping of coolant should effectively be prevented simple means. This should not rely on the skill of the operator, but instead, it should be ensured that coolant is effectively prevented from escaping from the coolant circuit, regardless of the respective handling.

The above objective is achieved with respect to the device by the features of claim 1. Accordingly, it is of primary importance that the coolant circuit comprises a conveyor for conveying the coolant. If this conveyor, normally a pump, a cylinder piston assembly, etc., is deactivated, no further coolant is conveyed from the coolant source. The internal pressure present in the coolant line would, however, be sufficient to cause a contamination of the environment with coolant when opening the coolant circuit. Consequently, the deactivation of the conveyor or the closing of the lines is not sufficient.

Furthermore, according to the invention, a special control device is provided, which serves, on one hand, to deactivate the conveyor, and on the other hand, causes a certain suction drainage in the inflow and outflow of the coolant circuit. This takes place such that in the coolant circuit, in particular in the region of the tool that is to be cooled, there is an at least slight negative pressure, specifically in the feed line and/or in the return line. As a result of this negative pressure, when the coolant circuit is opened, very little or no coolant is able to end up outside the coolant circuit.

In a manner according to the invention, two different measures are taken by the control device, specifically a deactivation of the conveyor, on one hand, and on the other hand, generation of a negative pressure in the feed line and/or in the return line.

At this point it should be noted that the term "conveyor" is to be understood in the broadest sense. Similarly, it is conceivable that the coolant circuit is connected to a domestic water system, such that a special conveyor is not necessary. As a further coolant source, a stationary or mobile cooling water supply having a tank, a pump and a heat exchanger, may be used, specifically for a self-contained supply. Instead of shutting off a conveyor, shut-off valves in the inflow and/or outflow can be closed, such that pressure can no longer be built up from the coolant source. The negative pressure generated in the coolant circuit effectively prevents escape of the coolant when the tool is removed, and in the removed tool.

The shut-off device can be manually or mechanically, electrically or pneumatically activated, as needed. This means that with maintenance, disruptions, in particular with a defective tool, e.g. on the cap of a robot welding device (torn cap), or with a defective hose (burst hose), the operator activates the control device. In the framework of a particularly advantageous design, the defect in the tool can be detected automatically, and the activation of the control device can likewise also take place automatically, wherein it is also advantageous when a signal is issued at the same time—optically and/or acoustically and/or electrically/electronically.

In accordance with the above explanations, the control device comprises means or mechanisms that act directly or indirectly on the coolant feed and the coolant return. In concrete terms, the shut-off device comprises a main valve supplied with pressurized air, wherein this valve can be a 3/2 directional valve or a 4/2 directional valve or a 5/2 directional valve. In concrete terms, this can be a single valve or a combination of valves in the manner of a valve cluster.

In any case, the main valve is supplied with pressurized air, wherein the main valve shuts off the inflow and/or the outflow, in each case with a shut-off valve, when actuated, preferably by means of pressurized air (or mechanically, by hand, or electrically).

When the shut-off valves in the inflow and/or outflow are closed, i.e. when coolant circulation is prevented in the coolant circuit, a further valve or a bypass, preferably formed in the outflow, is opened via a signal from the main valve, via which the return line and, if applicable, the feed line, are drained into the outflow to the drain. It should be noted that the coolant can flow through a pump provided there. A bypass is not needed in the framework of such a design, but merely a valve, which prevents backflow of the coolant in the outflow. The valve can be a non-return valve.

A pump is activated via the signal from the main valve, which pumps out the return line and, if applicable, the feed line, in such a way that there is at least a slight negative pressure in the coolant circuit, i.e. in the feed line and in the return line. This negative pressure can be detected or checked, and optionally displayed in an analog or digital manner, in order to provide the operator with a visual control.

The opening and closing of the bypass and the activation/deactivation of the pump can take place in a time-delayed manner, preferably via a permanently set or adjustable delay valve, or a corresponding valve device, wherein a corresponding delay unit can comprise a choke device, a non-return valve, a reservoir and a pressurized/spring-loaded multi-directional valve, for example.

The main valve discussed above, or another valve, preferably pneumatically activates a signal valve device, wherein the signal valve device compares the pressures of two or more liquids, wherein one of the liquids is the coolant, and the pressure that is to be detected corresponds to the coolant pressure in the inflow and/or outflow. Thus, the water pressure in the inflow, in particular, is compared with the air pressure arriving from the main valve by the signal valve device. When it falls below or exceeds a threshold value, the pump is activated with a constant fluid pressure, in particular constant air pressure, to generate an at least slight negative pressure in the coolant circuit and the bypass valve, such that prior to removing the tool the negative pressure necessary to prevent the escape of coolant is set.

The signal valve device can also compare the fluid pressure in the line by means of a measuring cell, and issue an electric/pneumatic signal.

After replacing the tool, i.e. after closing the coolant circuit, the normal operating state can be reset, specifically manually or mechanically, electrically or hydraulically.

The overall device, aside from the connections, pressurized air and, if applicable, current, can be accommodated in a mounting frame occupying the smallest possible space, and can be handled accordingly. This is of great advantage.

With respect to the control system according to the invention, the fundamental object is achieved by the features of the coordinate independent claim 10. The important thing thereby is that the control system comprises the current-specific features of the device discussed above. This primarily concerns the control device for deactivating the conveyor and for evacuating the inflow and/or outflow, such that an at least slight negative pressure is present in the feed line and/or return line in the region of the tool that is to be cooled, such that when the tool is released, an unintentional escape of coolant is prevented.

The control system according to the invention comprises the main valve discussed above, the signal valve, and the delay valve, wherein these contain hydraulic and pneumatic components, in order to fulfill the demands thereon.

The method according to the invention achieves the fundamental objective by means of the other coordinate independent claim 11, wherein the method is used with the device for supplying coolant according to the invention. The method steps can be implemented with a special control device, which comprises the main valve, the signal valve, and the delay valve. The control system functions between the supplying with coolant and pressurized air, such that the supplying with coolant can be shut off, and the coolant circuit can be brought to an at least slight negative pressure.

Figure 2:
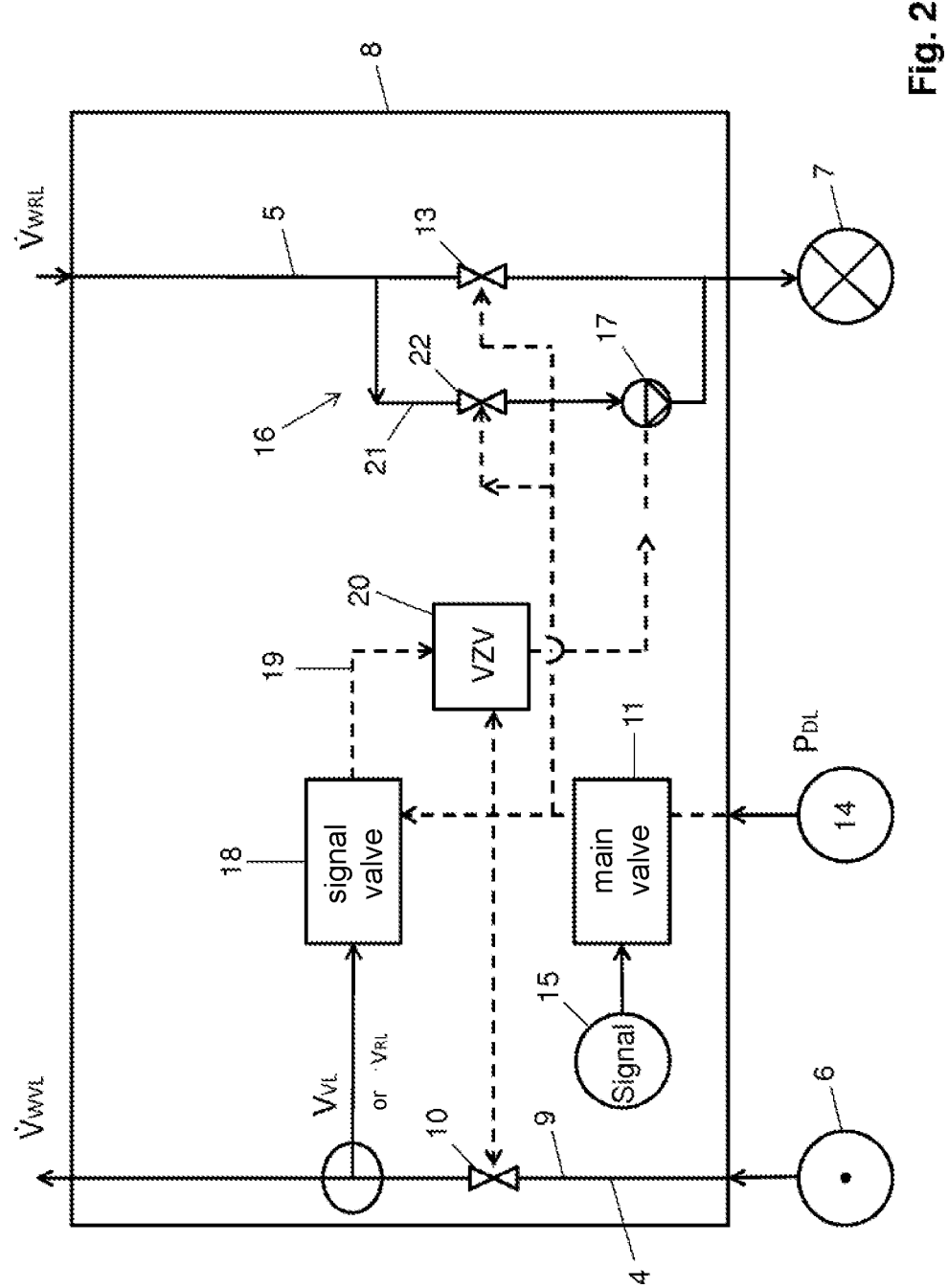
Figure 3:
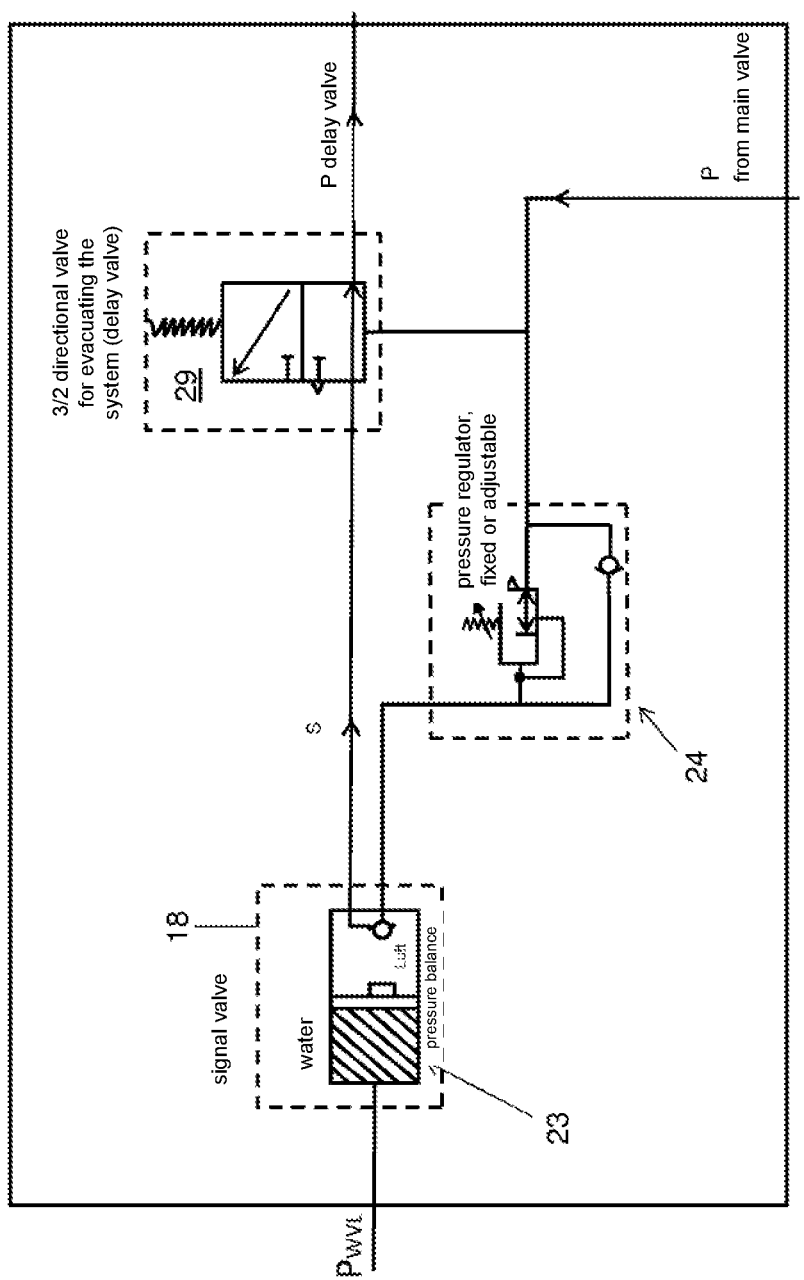
Figure 4:
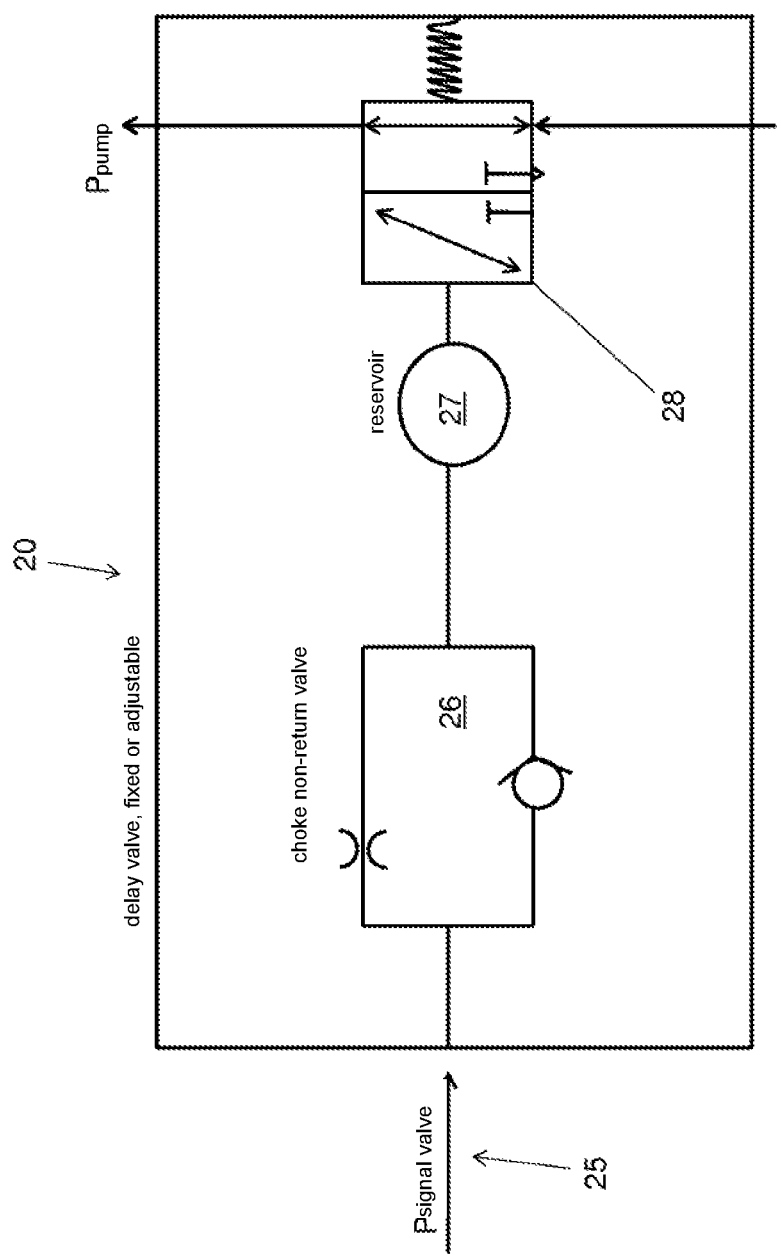

There are now various possibilities for embodying and developing the teachings of the present invention in an advantageous manner. For this, reference is made on one hand to the Claims subordinate to claim 1, and on the other hand, to the following explanation of a preferred exemplary embodiment of the invention based on the drawings. In conjunction with the explanation of the preferred exemplary embodiment of the invention based on the drawings, preferred designs and developments of the teachings shall also be explained in general. In the drawings:

FIG. 1 shows, in a schematic diagram/circuit diagram, the fundamental assembly of a device according to the invention, having a corresponding control system, FIG. 2 shows, in a schematic diagram/circuit diagram, in detail, the control device of the device according to the invention, FIG. 3 shows, in a schematic detail view, the construction of a signal valve according to the invention, for comparing different pressure signals, and FIG. 4 shows, in a schematic detail view, the construction of a delay valve, which can have a permanent setting or variable design.

FIG. 1 shows, in a schematic diagram, highly simplified, the fundamental function of an exemplary embodiment of a device according to the invention, that serves to supply coolant to the cap, which is merely indicated, serving as the tool 1 of a welding device 2. Coolant, or water, flows through the tool 1, thus forming a part of the coolant circuit 3. The coolant circuit 3 comprises an inflow 4 and an outflow 5. The tool can also comprise numerous coolant circuits, which split up downstream of the suction device, e.g. the supply for a transformer. Thus, various circuit arms can be provided as separate feed and return lines, which reconnect to one another downstream of the tool.

The coolant comes from a coolant source 6, flows via the inflow 4 through the tool 1 and via the outflow 5 into a coolant drain 7. The coolant source 6 and the coolant drain 7 can be united via a filter device interconnected between them. Similarly, it is conceivable that the coolant is water removed from a river, and later returned thereto. It is likewise conceivable to use a water connection or a water supply line, and to use the wastewater system as the drain. As noted in the general part of the description, a stationary or mobile cooling water supply having a pump, a tank, and a heat exchanger, can be provided as a further coolant source, which can be used as a self-contained supply.

It is further indicated in FIG. 1, that according to the invention, a control device 8 is provided, which serves for deactivating the conveyor (not shown in FIG. 1) or to shut off the inflow 4 and outflow 5.

The control device 8 furthermore serves to evacuate the inflow 4 and/or outflow, such that there is an at least slight negative pressure in the feed line 9 and/or return line 12 in the region of the tool 1 that is to be cooled. This negative pressure ensures that when the tool 1 is removed, the coolant remains in the coolant circuit, or at least does not escape the coolant circuit 3. A contamination of the environment and the operator is effectively prevented in this manner.

It is further indicated in FIG. 1 that the control device 8 is activated via a signal, specifically then when the tool 1 is to be changed, or has been changed, specifically due to a defect, a malfunction, etc. This signal can be triggered manually, or mechanically, electrically or pneumatically.

FIG. 2 shows, in a schematic diagram, the control device 8, which acts on the inflow 4, the outflow 5 and on an evacuation of the coolant circuit 3, in accordance with the preceding explanations regarding FIG. 1.

FIG. 2 shows that a shut-off valve 1C is provided in the inflow 4, or in the feed line 9, which can be activated via a main valve 11, or a main valve device. Furthermore, a shut-off valve 13 is likewise provided in the outflow 5, or in the return line 12, which can likewise be activated via the main valve 11.

The main valve 11 is supplied with pressurized air from outside the control device 8, specifically from a pressurized air source 14.

The main valve 11 is operated via a signal 15, by means of which the water supply is closed off via the shut-off valves 10, 13. For this, 2- or 3-way ball tap valves can be provided, by way of example.

At the same time, or shortly thereafter, a bypass 16 is opened and a pump 17 is activated, wherein the signal is generated via the main valve 11. The pressurized air signal (supply) is conveyed from the main valve to the pump 17 via the supply valve or the return valve. It should be noted that the signal does not necessarily have to come from the main valve. Instead, another valve may be provided, e.g. with the use of a valve cluster.

When the bypass 16 is opened and the pump 17 is activated, the pressure or pressure drop in the inflow 4 is measured.

A pressure comparison takes place with the exemplary embodiment selected here in a signal valve assembly 18, in this case a pressure comparison between the pressure in the inflow 4 and an air pressure. Accordingly, the signal valve assembly 18 comprises a type of pressure balance as an integrated component that can compare pressures of different or identical flow media with one another.

In the example discussed here, the dropping water pressure in the inflow 4 is compared with a constant air pressure. The signal valve assembly 18 forwards a signal or actuating variable for an air pressure 19, as soon as the detected water pressure falls below a predefined threshold value. It should be taken into account thereby that the inflow 4 contracts at least slightly when a hose line is used. The threshold value can be defined with both a negative as well as a positive pressure in the coolant line. The switching signal has the advantage with a negative pressure that the delay valve can be configured as a normal directional valve.

The air pressure 19, or the signal corresponding thereto, is conveyed as a constant air signal to a delay valve 20. This delay valve 20 can be equipped with a time constant serving for the delay. It is also conceivable to set the delay in a variable manner. Instead of the delay valve, a directional valve can also be provided.

Taking into account the delay caused by the delay valve 20, the pump 17 is shut off after a certain backflow. For this, the air supply to the pump 17 is interrupted. At this point in time, a certain negative pressure is obtained in the coolant circuit 3, which can be displayed optically and/or acoustically, and/or electrically/electronically.

The intended operation, specifically the changing of the tool and its removal from the coolant circuit 3, can then take place.

The bypass 16 specified above comprises a bypass line 21 and a shut-off valve 22. When the shut-off valve 22 is open, coolant can be removed from the outflow 5 via the pump 17, and thus, indirectly, from the inflow 4, specifically into the coolant drain 7. The shut-off valve 13 in the outflow is closed thereby. As noted in the general part of the description, media can also flow through the pump. In this case, a bypass is not necessary, but rather just a valve that prevents the return flow of the coolant into the outflow. A non-return valve can be used for this.

After exchanging the tool, specifically then when the tool 1 is again connected to the coolant circuit 3, or the inflow 4 and the outflow 5, the control device 8 can be reset, such that the machining operation can begin again. The reset can take place manually, electrically, or pneumatically.

FIG. 3 shows, in a schematic circuit diagram, in detail, an exemplary embodiment of a signal valve 18, which is used to compare the signals of different media in the manner of a level/pressure balance. A corresponding assembly 23 is provided. In order to avoid repetition, reference is made to the general description and the description of FIG. 2.

Furthermore, a pressure regulator 24 is provided, having a permanent setting. It is also conceivable that the pressure regulator 24 can be adjusted.

FIG. 3 further shows a 3/2 directional valve 29 for evacuating the air. The signal is conducted from there to the actual delay valve 20.

FIG. 4 shows, in a schematic view, the delay valve 20, as a component of the control device 8. The delay valve 20 is subjected to a signal valve pressure 25 by the signal valve assembly 18. It can contain pneumatic components for implementing the desired delay, e.g. a choke with a non-return valve 26, a reservoir, a time-delayed directional valve 28, etc. The important thing with the delay valve 20 is that a predefined delay is implemented there. Alternatively, the delay could be variable or adjustable with respect to the output signal, i.e. the signal to the pump 17. When there is a negative pressure in the coolant circuit the threshold value can trigger an actuation.

With a negative pressure, the switching signal has the advantage that the delay valve can be configured as a normal directional valve.

It is further noted that the control system can also be constructed differently. For this, in a particularly simple embodiment, just a signal valve and a simplified pump in the form of a suction cylinder in the outflow are necessary. A bypass is not necessary in the framework of such a configuration. The coolant water inflow is closed by a shut-off valve, wherein the signal valve compares the inflow and the outflow pressures. A pneumatic signal is actuated at the suction cylinder and at the shut-off valve in the coolant water outflow when the outflow pressure and the inflow pressure are equalized. It is only necessary thereby that the two pressures are close to one another, but not actually identical.

With respect to further advantageous designs of the device according to the invention, reference is made to the general part of the description, as well as the attached Claims, in order to avoid repetition.

Lastly, it should be expressly noted that the exemplary embodiment described above, of the device according to the invention, serves only as a means for discussing the claimed teachings, which are not, however, limited to the exemplary embodiment.

LIST OF REFERENCE SYMBOLS 1 tool
2 welding device
3 coolant circuit
4 inflow (of the coolant circuit)
5 outflow (of the coolant circuit)
6 coolant source
7 coolant drain
8 control device
9 feed line
10 shut-off valve (inflow)
11 main valve
12 return line
13 shut-off valve (outflow)
14 pressurized air source
15 signal
16 bypass
17 pump
18 signal valve assembly, signal valve
19 air pressure
20 delay valve
21 bypass line
22 shut-off valve (bypass)

23 assembly, pressure balance
24 pressure regulator
25 signal valve pressure
26 choke/non-return valve
27 reservoir
28 directional valve
29 air evacuation valve

The invention claimed is:

1. A device for supplying coolant to a machining device that is to be provided with fluid coolant, comprising:
   a region that is to be cooled or a tool that is to be cooled, that is incorporated in an open or closed coolant circuit having an inflow (4) and an outflow (5), which has a conveyor operating in the coolant circuit for conveying the coolant in the coolant circuit, and
   a control device (8) for performing one or more of deactivating the conveyor, shutting off the inflow (4), and shutting off the outflow (5), and for evacuating the inflow (4) and/or the outflow (5) in such a way that in the region of the tool that is to be cooled at least a slight negative pressure is present in a feed line (9) and/or in a return line (12),
   wherein a bypass (16) is opened via a signal from a main valve (11), via which the return line (12) and/or the feed line (9) are drained into the outflow, or a fluid-flow pump and a non-return valve are provided in the outflow (5) without the provision of a bypass, and wherein the non-return valve prevents the coolant from flowing back in the outflow (5).

2. The device according to claim 1, characterized in that the control device can be activated mechanically, electrically, or pneumatically.

3. The device according to claim 1, characterized in that the control device main valve is supplied with pressurized air, which closes the inflow/outflow upon actuation, by the pressurized air, mechanically by hand, or electrically.

4. The device according to claim 1, characterized in that a pump is activated via the signal from the main valve, which pumps out the return line, and/or the feed line.

5. The device according to claim 4, characterized in that the opening and closing of the bypass, and the activation/deactivation of the pump is delayed, via a permanently set or adjustable delay valve.

6. The device according to claim 1, characterized in that the main valve activates a signal valve device, which compares pressures of two or more fluids with one another.

7. The device according to claim 6, wherein the pressures of two or more fluids comprise the water pressure in the inflow with air pressure in the main valve, and when the water pressure falls below or exceeds a threshold value, activates the pump and the bypass with a constant fluid pressure.

8. The device according to claim 1, characterized in that after exchanging the tool, manually or mechanically, electrically or hydraulically, the normal operating state can be reset.

9. The device according to claim 1, characterized in that the entire device, aside from connections for water, pressurized air, and/or, current, is disposed in a mounting frame.

10. The device according to claim 1, wherein the device is one of a welding device or a welding robot.

11. The device according to claim 1, wherein the tool comprises a welding cap.

12. A method for using the device according to claim 1, comprising the steps of:
   evacuating the inflow and/or the outflow; and
   opening the bypass via which the return line or the feed line are drained into the outflow or providing the non-return valve in the outflow which prevents the coolant from flowing back in the outflow.

* * * * *